US012769355B2

(12) United States Patent
Lan

(10) Patent No.: US 12,769,355 B2
(45) Date of Patent: Oct. 20, 2026

(54) SWITCHING CIRCUIT AND CLOCK SUPPLY CIRCUIT

(71) Applicant: Nuvoton Technology Corporation, Hsinchu Science Park (TW)

(72) Inventor: Yung-Chi Lan, Taichung City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 124 days.

(21) Appl. No.: 18/971,514

(22) Filed: Dec. 6, 2024

(65) Prior Publication Data

US 2025/0208644 A1 Jun. 26, 2025

(30) Foreign Application Priority Data

Dec. 22, 2023 (TW) ................................ 112150259

(51) Int. Cl.
*G06F 1/00* (2006.01)
*G06F 1/08* (2006.01)

(52) U.S. Cl.
CPC ..................................... *G06F 1/08* (2013.01)

(58) Field of Classification Search
CPC ......................................................... G06F 1/08
See application file for complete search history.

(56) References Cited

U.S. PATENT DOCUMENTS

| | | | | |
|---|---|---|---|---|
| 4,525,667 | A * | 6/1985 | Sawano | G01R 31/3177 714/E11.155 |
| 5,155,380 | A | 10/1992 | Hwang et al. | |
| 10,884,448 | B1 * | 1/2021 | Lan | G06F 21/725 |
| 2009/0319821 | A1 * | 12/2009 | Tyrrell | H03K 5/1252 713/601 |
| 2022/0216860 | A1 * | 7/2022 | Kimura | G06F 1/10 |
| 2022/0302840 | A1 * | 9/2022 | Assaad | H02M 1/08 |
| 2023/0341891 | A1 * | 10/2023 | Lu | G06F 1/08 |
| 2024/0137012 | A1 * | 4/2024 | Kang | G06F 1/08 |

* cited by examiner

*Primary Examiner* — Mohammed H Rehman
(74) *Attorney, Agent, or Firm* — Muncy, Geissler, Olds & Lowe, P.C.

(57) ABSTRACT

A switching circuit coupled to a first oscillator circuit and a second oscillator is provided. The first oscillator circuit generates a first clock signal according to a first enable signal. The second oscillator generates a second clock signal according to a second enable signal. The switching circuit uses the first or second clock signal as an output clock according to a detection signal. The switching circuit includes a first D-type flip-flop and a second D-type flip-flop. The first D-type flip-flop includes a first reset terminal receiving the first enable signal. The second D-type flip-flop includes a second reset terminal receiving the second enable signal.

20 Claims, 5 Drawing Sheets

200A

SWITCHING CIRCUIT AND CLOCK SUPPLY CIRCUIT

CROSS REFERENCE TO RELATED APPLICATIONS

This application claims priority of Taiwan Patent Application No. 112150259, filed on Dec. 22, 2023, the entirety of which is incorporated by reference herein.

BACKGROUND OF THE INVENTION

Field of the Invention

The present invention relates to a switching circuit, and, in particular, to a switching circuit that changes clock signals.

Description of the Related Art

The functions and types of electronic devices have increased due to technological development. Each electronic device comprises many digital circuits. Most of the driving signals of digital circuits are clock signals. A clock signal needs to be switched to different frequencies based on the application scenario. Therefore, most of the electronic devices have at least two clock sources for generating at least two clock signals with different frequencies. However, when the clock signals are switched, it is easy for glitches to form in clock signals, thereby affecting the stability of the system.

BRIEF SUMMARY OF THE INVENTION

In accordance with an embodiment of the disclosure, a switching circuit is coupled to a first oscillator circuit and a second oscillator. The first oscillator circuit generates a first clock signal according to a first enable signal. The second oscillator generates a second clock signal according to a second enable signal. The switching circuit comprises a detection circuit, an inverter, a first determination circuit, a first D-type flip-flop, a second determination circuit, a second D-type flip-flop, and a clock gating circuit. The detection circuit detects a third enable signal and a fourth enable signal to generate a detection signal. The inverter inverts a selection signal to generate an inverted signal. The first determination circuit outputs the inverted signal in response to the detection signal being at a specific level. The first D-type flip-flop receives the inverted signal and uses the inverted signal as the third enable signal according to the first clock signal. The second determination circuit outputs the selection signal in response to the detection signal being at the specific level. The second D-type flip-flop receives the selection signal and uses the selection signal as the fourth enable signal according to the second clock signal. The clock gating circuit uses the first or second clock signal as an output clock according to the third and fourth enable signals. The first D-type flip-flop comprises a first reset terminal receiving the first enable signal. The second D-type flip-flop comprises a second reset terminal receiving the second enable signal.

In accordance with another embodiment of the disclosure, a clock supply circuit provides an output clock according to a selection signal and comprises a first oscillator circuit, a second oscillator circuit, and a switching circuit. The first oscillator circuit generates a first clock signal according to a first enable signal. The second oscillator circuit generates a second clock signal according to a second enable signal. The switching circuit uses the first or second clock signal as the output clock according to the selection signal and comprises a detection circuit, an inverter, a first determination circuit, a first D-type flip-flop, a second determination circuit, a second D-type flip-flop, and a clock gating circuit. The detection circuit detects a third enable signal and a fourth enable signal to generate a detection signal. The inverter inverts the selection signal to generate an inverted signal. The first determination circuit outputs the inverted signal in response to the detection signal being at a specific level. The first D-type flip-flop receives the inverted signal and uses the inverted signal as the third enable signal according to the first clock signal. The second determination circuit outputs the selection signal in response to the detection signal being at the specific level. The second D-type flip-flop receives the selection signal and uses the selection signal as the fourth enable signal according to the second clock signal. The clock gating circuit uses the first or second clock signal as the output clock according to the third and fourth enable signals. The first D-type flip-flop comprises a first reset terminal receiving the first enable signal. The second D-type flip-flop comprises a second reset terminal receiving the second enable signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
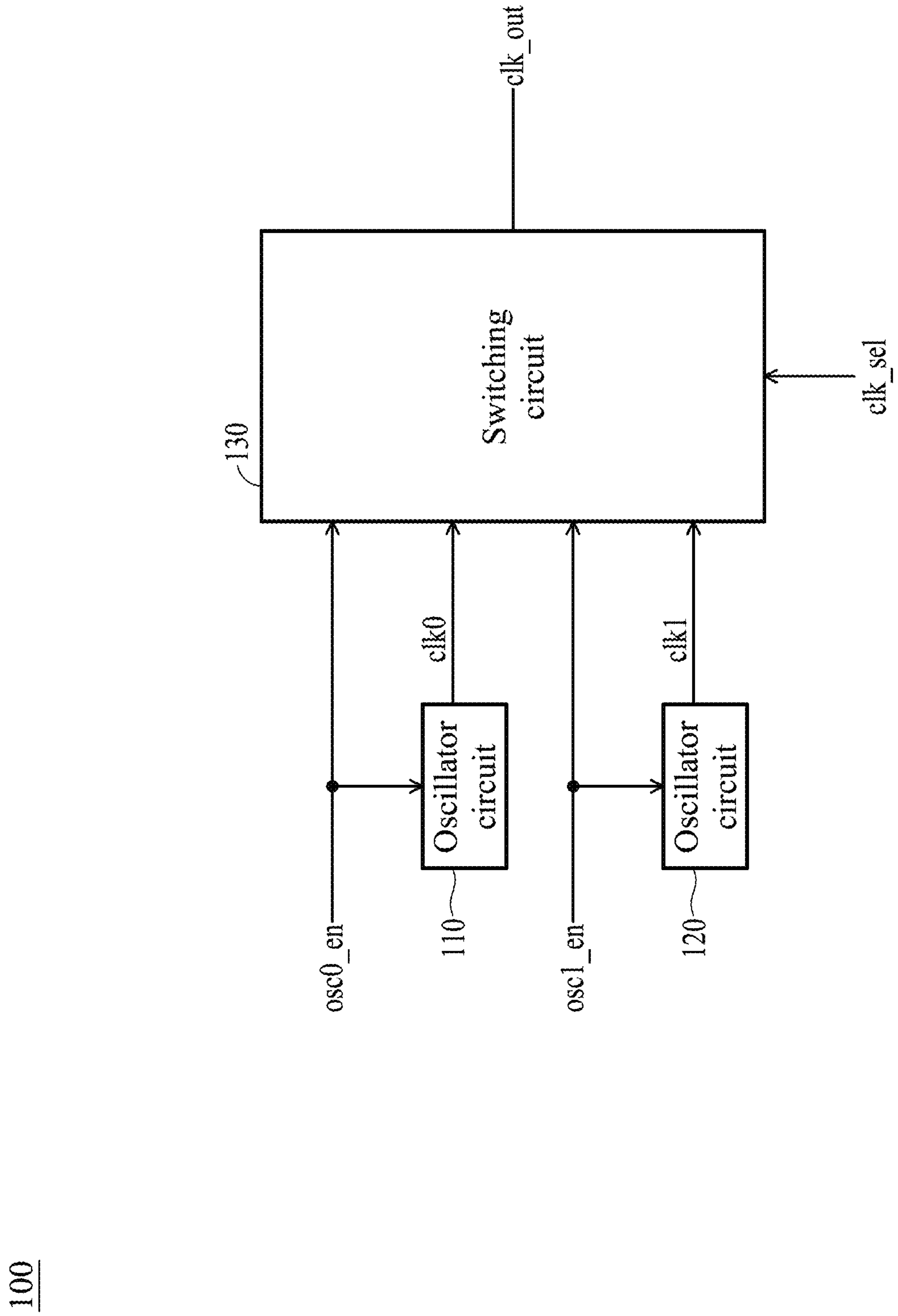
FIG. 1 is a schematic diagram of an exemplary embodiment of a clock supply circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a clock supply circuit according to various aspects of the present disclosure. The clock supply circuit 100 provides an output clock clk_out to a load (not shown) according to a selection signal clk_sel. In this embodiment, the clock supply circuit 100 comprises oscillator circuits 110 and 120, and a switching circuit 130. In some embodiments, the oscillator circuits 110 and 120, and the switching circuit 130 are integrated into a system on a chip (SOC).

The oscillator circuit 110 generate a clock signal clk0 according to an enable signal osc0_en. In one embodiment, when the enable signal osc0_en is enabled, the enable signal osc0_en is at a specific level, such as a low level. At this time, the oscillator circuit 110 generates the clock signal clk0. When the enable signal osc0_en is disabled, the enable signal osc0_en is not in the specific level. Therefore, the oscillator circuit 110 stops generating the clock signal clk0. In one embodiment, when the enable signal osc0_en is disabled, the enable signal osc0_en is at a high level. The structure of the oscillator circuit 110 is not limited in the present disclosure. Any circuit can serve as the oscillator circuit 110, as long as the circuit is capable of generating a clock signal.

The oscillator circuit 120 generates a clock signal clk1 according to an enable signal osc1_en. Since the characteristic of the oscillator circuit 120 is the same as the characteristic of the oscillator circuit 110, the description of the oscillator circuit 120 is omitted. In one embodiment, the frequency of the clock signal clk1 is different from the frequency of the clock signal clk0.

The switching circuit 130 uses the clock signal clk0 or clk1 as the output clock clk_out according to the selection signal clk_sel. For example, when the selection signal clk_sel is at a first level (e.g., a low level), the switching circuit 130 uses the clock signal clk0 as the output clock clk_out. When the selection signal clk_sel is at a second level (e.g., a high level), the switching circuit 130 uses the clock signal clk1 as the output clock clk_out.

Figure 2A:
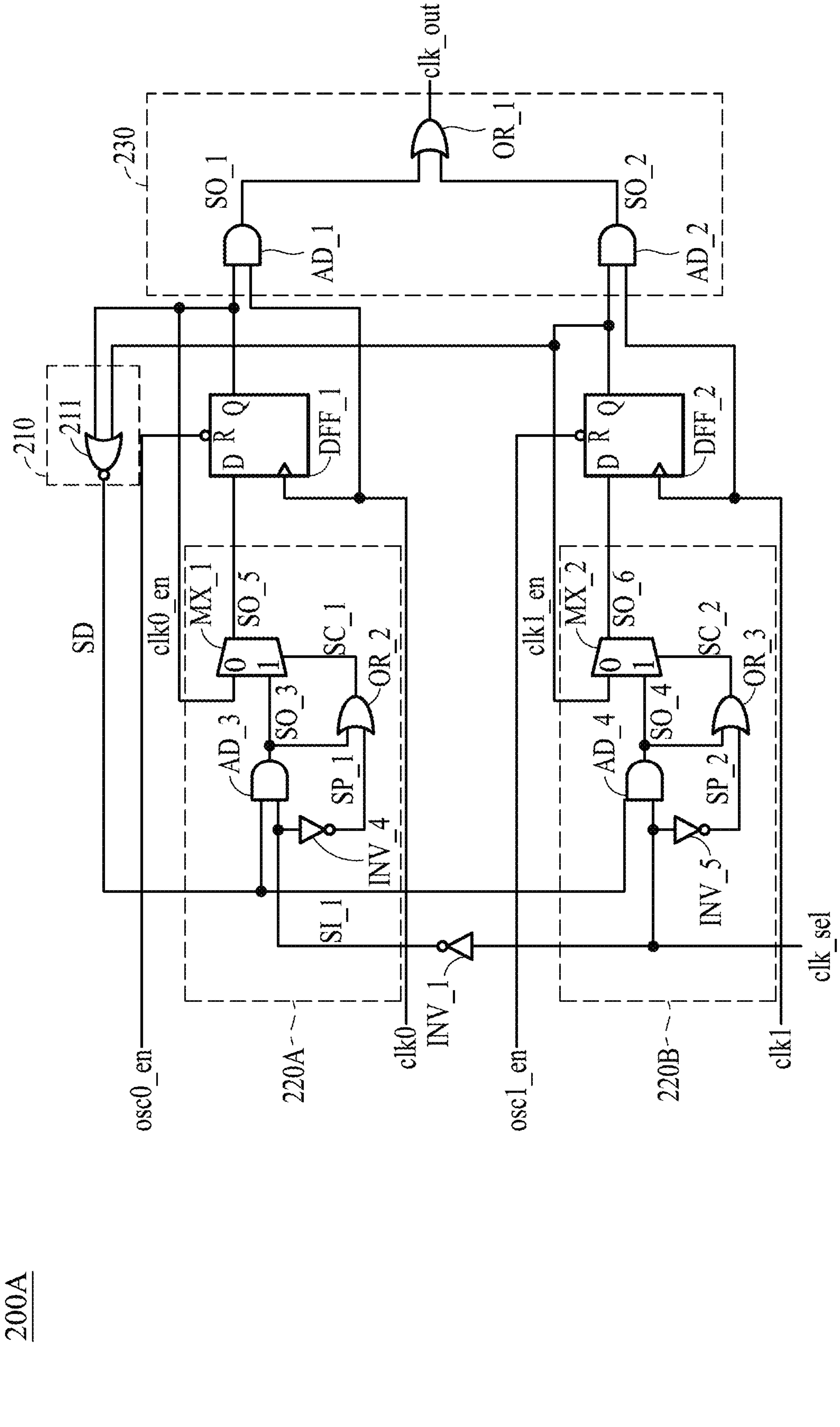
FIG. 2A is a schematic diagram of an exemplary embodiment of a switching circuit according to various aspects of the present disclosure.

FIG. 2A is a schematic diagram of an exemplary embodiment of the switching circuit according to various aspects of the present disclosure. As shown in FIG. 2A, the switching circuit 200A comprises a detection circuit 210, an inverter INV_1, determination circuits 220A and 220B, D-type flip-flops DFF_1 and DFF_2, and a clock gating circuit 230.

The detection circuit 210 is configured to generate a detection signal SD according to the enable signals osc0_en and clk1_en. In this embodiment, when the enable signals osc0_en and clk1_en are at a first specific level (e.g., a high level), the detection circuit 210 sets the detection signal SD to a second specific level, such as a low level. When the enable signals osc0_en and clk1_en are at the second specific level (e.g., a low level), the detection circuit 210 sets the detection signal SD to the first specific level, such as a high level. The structure of detection circuit 210 is not limited in the present disclosure. In one embodiment, the detection circuit 120 is a NOR gate 211. The NOR gate 211 receives the enable signals osc0_en and clk1_en and provides the detection signal SD.

The inverter INV_1 inverts the selection signal clk_sel to generate an inverted signal SI_1.

The determination circuit 220A provides an output signal SO_5 to the D-type flip-flop DFF_1 according to the detection signal SD, the inverted signal SI_1, and an enable signal clk0_en. In one embodiment, when the detection signal SD is at a first specific level (e.g., a high level), it indicates that the enable signals clk0_en and clk1_en are at a second specific level (e.g., a low level). Therefore, the determination circuit 220A sets the output signal SO_5 so that it is equal to the inverted signal SI_1. In another embodiment, when the detection signal SD is at a second specific level, it indicates that at least one of the enable signals clk0_en and clk1_en is not in the second specific level. Therefore, the determination circuit 220A sets the output signal SO_5 so that it is equal to the enable signal clk_en or equal to a low level.

The structure of determination circuit 220A is not limited in the present disclosure. In one embodiment, the determination circuit 220A comprises an AND gate AD_3, a OR gate OR_2 and a multiplexer MX_1. The AND gate AD_3 generate an output signal SO_3 according to the detection signal SD and the inverted signal SI_1. The OR gate OR_2 generates a control signal SC_1 according to the output signal SO_3 and a processed signal SP_1.

In one embodiment, the processed signal SP_1 is the same as the selection signal clk_sel. Therefore, one input terminal of the OR gate OR_2 may be directly connected to the input terminal of the inverter INV_1. The multiplexer MX_1 sets the output signal SO_5 so that it is equal to the enable signal clk0_en or the output signal SO_3 according to the control signal SC_1. In some embodiments, the determination circuit 220A further comprises an inverter INV_4. The inverter INV_4 inverts the inverted signal SI_1 To generate the processed signal SP_1.

The D-type flip-flop DFF_1 receives the output signal SO_5 and provides the enable signal clk0_en according to the clock signal clk0. In one embodiment, the D-type flip-flop DFF_1 uses the inverted signal SI_1 as the enable signal clk0_en. In this embodiment, the input terminal D of the D-type flip-flop DFF_1 receives the output signal SO_5. The clock terminal of the D-type flip-flop DFF_1 receives the clock signal clk0. The output terminal Q of the D-type flip-flop DFF_1 provides the enable signal clk_en. The reset terminal R of the D-type flip-flop DFF_1 receives the enable signal osc0_en. In one embodiment, when the enable signal osc0_en is at a low level (referred to as a second specific level), the D-type flip-flop DFF_1 sets the enable signal clk0_en to a low level.

The determination circuit 220B provides an output signal SO_6 to the D-type flip-flop DFF_2 according to the detection signal SD, the selection signal clk_sel and the enable signal clk1_en. In one embodiment, when the detection signal SD is at a first specific level, it indicates that the enable signals clk0_en and clk1_en are at a second specific level. Therefore, the determination circuit 220B sets the output signal SO_6 so that it is equal to the selection signal clk_sel. In another embodiment, when the detection signal SD is at a second specific level, it indicates that at least one of the enable signals clk0_en and clk1_en is not in the second specific level. Therefore, the determination circuit 220B sets the output signal SO_6 to a low level or to a level that is equal to the enable signal clk1_en according to the selection signal clk_sel.

The structure of determination circuit 220B is not limited in the present disclosure. In one embodiment, the determination circuit 220B comprises an AND gate AD_4, a OR gate OR_3 and a multiplexer MX_2. The AND gate AD_4 generates an output signal SO_4 according to the detection signal SD and the selection signal clk_sel. The OR gate OR_3 generates a control signal SC_2 according to the output signal SO_4 and a processed signal SP_2.

In one embodiment, the processed signal SP_2 is the same as the inverted signal SI_1. Therefore, one input terminal of the OR gate OR_3 may be directly connected to the output terminal of the inverter INV_1. The multiplexer MX_2 sets the output signal SO_6 so that it is equal to the enable signal clk1_en or the output signal SO_4 according to the control signal SC_2. In some embodiments, the determination circuit 220B further comprises an inverter INV_5. The inverter INV_5 inverts the selection signal clk_sel to generate the processed signal SP_2.

The D-type flip-flop DFF_2 receives the output signal SO_6 and provides the enable signal clk1_en according to the clock signal clk1. In one embodiment, the D-type flip-flop DFF_2 uses the selection signal clk_sel as the enable signal clk1_en. In this embodiment, the input terminal D of the D-type flip-flop DFF_2 receives the output signal SO_6. The clock terminal of the D-type flip-flop DFF_2 receives the clock signal clk1. The output terminal Q of the D-type flip-flop DFF_2 provides the enable signal clk1_en. The reset terminal R of the D-type flip-flop DFF_2 receives the enable signal osc1_en. In one embodiment, when the enable signal osc1_en is at a low level, the D-type flip-flop DFF_2 sets the enable signal clk1_en to a low level.

The clock gating circuit 230 uses the clock signal clk0 or clk1 as the output clock clk_out according to the enable signals clk0_en and clk1_en. For example, when the enable signal clk0_en is at a first specific level, it indicates that the enable signal clk0_en is enabled. Therefore, the clock gating circuit 230 uses the clock signal clk0 as the output clock clk_out. When the enable signal clk1_en is at a first specific level, it indicates that the enable signal clk1_en is enabled. Therefore, the clock gating circuit 230 uses the clock signal clk1 as the output clock clk_out. The structure of clock gating circuit 230 is not limited in the present disclosure. In one embodiment, the clock gating circuit 230 comprises AND gates AD_1, AD_2, and a OR gate OR_1.

The AND gate AD_1 determines whether to use the clock signal clk0 as an output signal SO_1 according to the enable signal clk0_en. For example, when the enable signal clk0_en is at a high level (referred to as a first specific level), the AND gate AD_1 uses the clock signal clk0 as the output signal SO_1. When the enable signal clk0_en is at a low level (referred to as a second specific level), the AND gate AD_1 stops using the clock signal clk0 as the output signal SO_1. At this time, the AND gate AD_1 may set the output signal SO_1 to a low level.

The AND gate AD_2 determines whether to use the clock signal clk1 as an output signal SO_2 according to the enable signal clk1_en. Since the operation of the AND gate AD_2 is the same as the operation of the AND gate AD_1, the description of the AND gate AD_2 is omitted. The OR gate OR_1 generates the output clock clk_out according to the output signals SO_1 and SO_2. For example, when the AND gate AD_1 uses the clock signal clk0 as the output signal SO_1, the OR gate OR_1 uses the clock signal clk0 as the output clock clk_out. When the AND gate AD_2 uses the clock signal clk1 as the output signal SO_2, the OR gate OR_1 uses the clock signal clk1 as the output clock clk_out.

In this embodiment, the detection circuit 210 detects the enable signals clk0_en and clk1_en so that the determination circuits 220A and 220B direct the clock gating circuit 230 to switch the output clock clk_out in a specific condition (e.g., the enable signals clk0_en and clk1_en are at a low level). Therefore, no glitch occurs in the output clock clk_out.

Figure 2B:
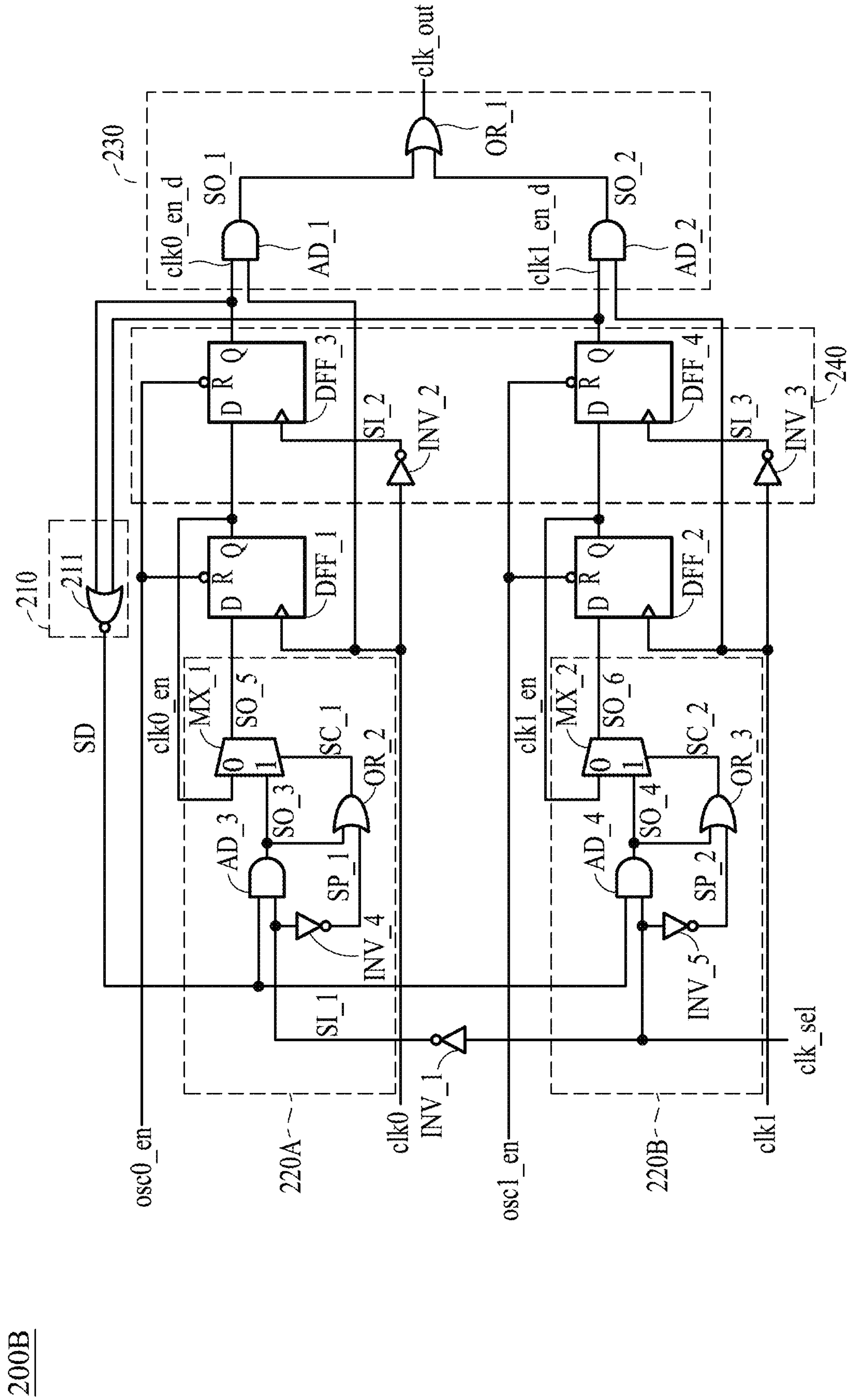
FIG. 2B is a schematic diagram of another exemplary embodiment of the switching circuit according to various aspects of the present disclosure.

FIG. 2B is a schematic diagram of another exemplary embodiment of the switching circuit according to various aspects of the present disclosure. FIG. 2B is similar to FIG. 2A with the exception that the switching circuit 200B of FIG. 2B further comprises a synchronization circuit 240. The synchronization circuit 240 is used to compensate for the metastable state caused by the asynchronous signals in different clock domains.

For example, when the clock domain of the selection signal clk_sel is different from the clock domains of the clock signals clk0 and clk1, the time point when the level of the selection signal clk_sel is changed may be very near the rising edge or the falling edge of the clock signal clk0 or clk1. Therefore, the output clock clk_out is in a metastable state, causing the circuits that receive the output clock clk_out to operate abnormally.

However, the synchronization circuit 240 can avoid that when the level of the selection signal clk_sel is changed, the clock gating circuit 230 immediately uses the clock signal clk0 or clk1 as the output clock clk_out. In one embodiment, the synchronization circuit 240 waits for a period of time and then directs the clock gating circuit 230 to use the clock signal clk0 or clk1 as the output clock clk_out.

In this embodiment, the synchronization circuit 240 comprises inverters INV_2 and INV_3, and D-type flip-flops DFF_3 and DFF_4. The inverter INV_2 inverts the clock signal clk0 to generate an inverted signal SI_2. The inverter INV_3 inverts the clock signal clk1 to generate an inverted signal SI_3.

The D-type flip-flop DFF_3 is coupled between the D-type flip-flop DFF_1 and the clock gating circuit 230 and uses the enable signal clk0_en as a delayed signal clk0_en_d according to the inverted signal SI_2. In this embodiment, the input terminal D of the D-type flip-flop DFF_3 receives the enable signal clk0_en. The clock terminal of the D-type flip-flop DFF_3 receives the inverted signal SI_2. The output terminal Q of the D-type flip-flop DFF_3 provides the delayed signal clk0_en_d. The reset terminal R of the D-type flip-flop DFF_3 receives the enable signal osc0_en. In one embodiment, when the enable signal osc0_en is at a low level, the D-type flip-flop DFF_3 sets the delayed signal clk0_en_d to a low level.

D-type flip-flop DFF_4 is coupled between the D-type flip-flop DFF_2 and the clock gating circuit 230 and uses the enable signal clk1_en as a delayed signal clk1_en_d according to the inverted signal SI_3. In this embodiment, the input terminal D of the D-type flip-flop DFF_4 receives the enable signal clk1_en. The clock terminal of the D-type flip-flop DFF_4 receives the inverted signal SI_3. The output terminal Q of the D-type flip-flop DFF_4 provides the delayed signal clk1_en_d. The reset terminal R of the D-type flip-flop DFF_4 receives the enable signal osc1_en. In one embodiment, when the enable signal osc1_en is at a low level, the D-type flip-flop DFF_4 sets the delayed signal clk1_en_d to a low level.

In this embodiment, the AND gate AD_1 of the clock gating circuit 230 receives the delayed signal clk0_en_d and determines whether to use the clock signal clk0 as the output signal SO_1 according to the delayed signal clk0_en_d. For example, when the delayed signal clk0_en_d is at a first specific level (e.g., a high level), the AND gate AD_1 uses the clock signal clk0 as the output signal SO_1. When the delayed signal clk0_en_d is at a second specific level (e.g., a low level), the AND gate AD_1 stops using the clock signal clk0 as the output signal SO_1. At this time, the AND gate AD_1 may set the output signal SO_1 to the second specific level.

The AND gate AD_2 of the clock gating circuit 230 receives the delayed signal clk1_en_d and determines whether to use the clock signal clk1 as the output signal SO_2 according to the delayed signal clk1_en_d. For example, when the delayed signal clk1_en_d is at a first specific level, the AND gate AD_2 uses the clock signal clk1 as the output signal SO_2. When the delayed signal clk1_en_d is at a second specific level, the AND gate AD_2 stops using the clock signal clk1 as the output signal SO_2.

At this time, the AND gate AD_2 may set the output signal SO_2 to the second specific level.

In this embodiments, the detection circuit 210 detects the delayed signals clk0_en_d and clk1_en_d to generate the detection signal SD. In this case, when the delayed signals clk0_en_d and clk1_en_d are at a first specific level (e.g., a high level), the detection circuit 210 sets the detection signal SD to a second specific level (e.g., a low level). When the delayed signals clk0_en_d and clk1_en_d are at a second specific level (e.g., a low level), the detection circuit 210 sets the detection signal SD to a first specific level (e.g., a high level).

Figure 3:
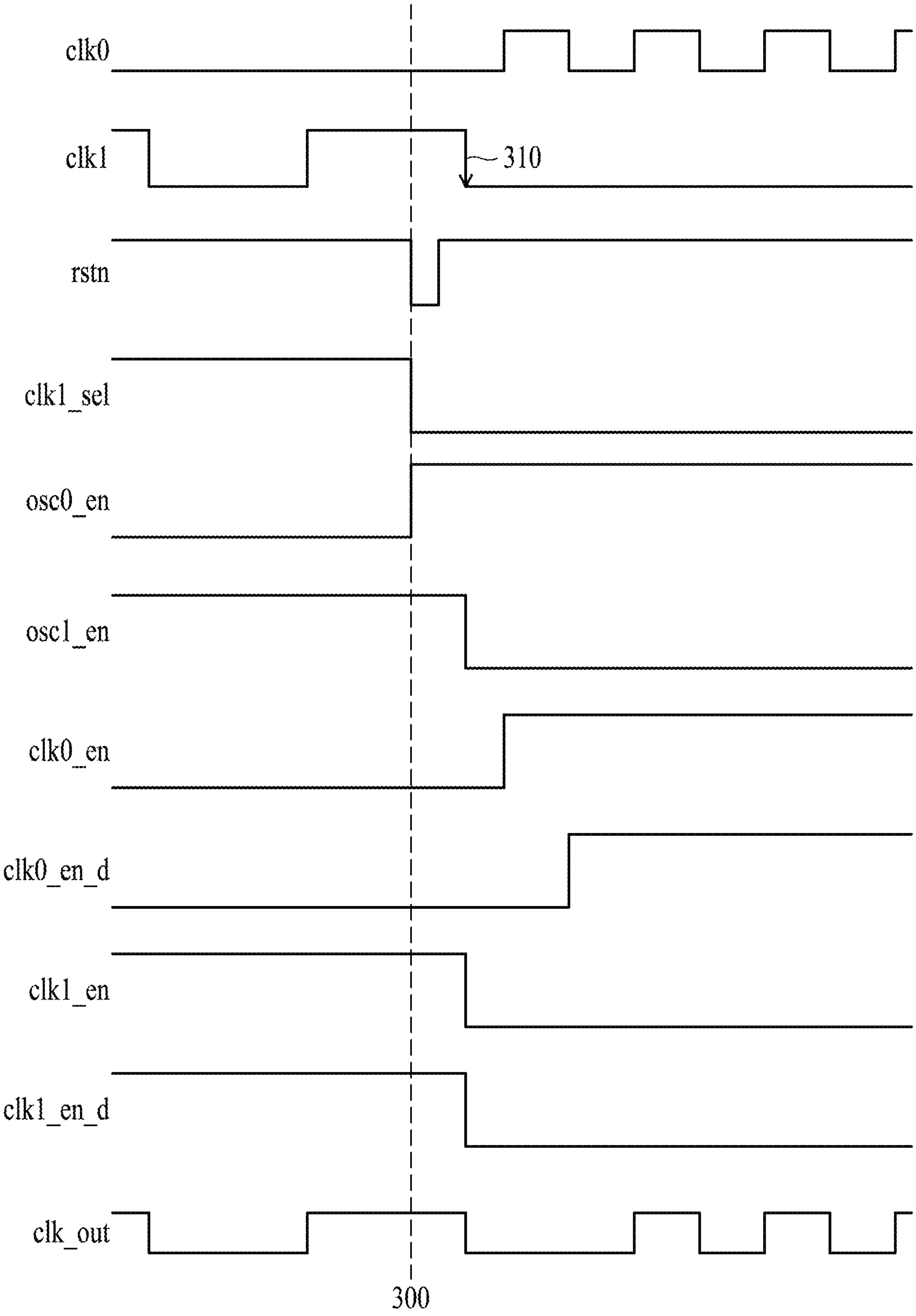
FIG. 3 is a timing schematic diagram of an exemplary embodiment of the switching circuit according to various aspects of the present disclosure.

FIG. 3 is a timing schematic diagram of an exemplary embodiment of the switching circuit according to various aspects of the present disclosure. Before time point 300, there is no a first specific event. Therefore, a reset signal rstn is at a high level. At this time, the selection signal clk_sel is at a high level to require that the output clock clk_out provided by the determination circuit 220B needs to be equal to the clock signal clk1.

Before time point 300, the enable signal osc0_en is at a low level and the enable signal osc1_en is at a high level. Therefore, the oscillator circuit 110 stops generating the clock signal clk0, and the oscillator circuit 120 generates the clock signal clk1. In this case, since the oscillator circuit 110 does not continuously generate the clock signal clk0, the power consumption of the clock supply circuit 100 can be reduced.

Additionally, since the enable signal clk0_en is at a low level, the delayed signal clk0_en_d is also in a low level. Therefore, the AND gate AD_1 of the clock gating circuit 230 does not output the clock signal clk0. At this time, since the enable signal clk1_en is at a high level, the delayed signal clk1_en_d is also in a high level. Therefore, the AND gate AD_2 of the clock gating circuit 230 outputs the clock signal clk1. The OR gate OR_1 uses the clock signal clk1 as the output clock clk_out.

In time point 300, there is a specific event. Therefore, the reset signal rstn is enabled. The level of the reset signal rstn is changed from a high level to a low level, and then returns to the high level. When the reset signal rstn is enabled, the selection signal clk_sel is reset into a first predetermined level, such as a low level. At this time, the enable signal osc0_en is reset into a second predetermined level, such as a high level and the enable signal osc1_en is reset into a third predetermined level, such as a low level. In some embodiments, the enable signal osc1_en is changed to the third predetermined level after the falling edge 310 of the clock signal clk1.

Since the enable signal osc0_en is at a high level, the oscillator circuit 110 generates the clock signal clk0. Since the enable signal osc1_en is at a low level, the oscillator circuit 120 does not generate the clock signal clk1. At this time, since the enable signal osc1_en is at the low level, the D-type flip-flop DFF_2 sets the enable signal clk1_en and the D-type flip-flop DFF_4 sets the delayed signal clk1_en_d so that the enable signal clk1_en and the delayed signal clk1_en_d are at a low level.

To avoid glitches, the enable signal clk0_en is delayed for a period of time and then changed from a low level to a high level. Next, to avoid generating a metastable state, the delayed signal clk0_en_d waits for a period of time and then changes from a low level to a high level after the enable signal clk0_en changes from a low level to a high level. Since the delayed signal clk0_en_d is at a high level, the AND gate AD_1 of the clock gating circuit 230 outputs the clock signal clk0 and the OR gate OR_1 of the clock gating circuit 230 uses the clock signal clk0 as the output clock clk_out.

In this embodiment, since the enable signal clk0_en is at a low level, the delayed signal clk0_en_d is at a low level after a half cycle of the clock signal clk0. Therefore, the AND gate AD_1 of the clock gating circuit 230 does not output the clock signal clk0. At this time, since the delayed signal clk1_en_d is at a high level, the AND gate AD_2 of the clock gating circuit 230 outputs the clock signal clk1. Since the enable signal osc1_en is at a high level, the oscillator circuit 120 generates the clock signal clk1 and the OR gate OR_1 of the clock gating circuit 230 uses the clock signal clk1 as the output clock clk_out. Before time point 300, since the enable signal osc0_en is a low level, the oscillator circuit 110 stops generating the clock signal clk0.

Figure 4:
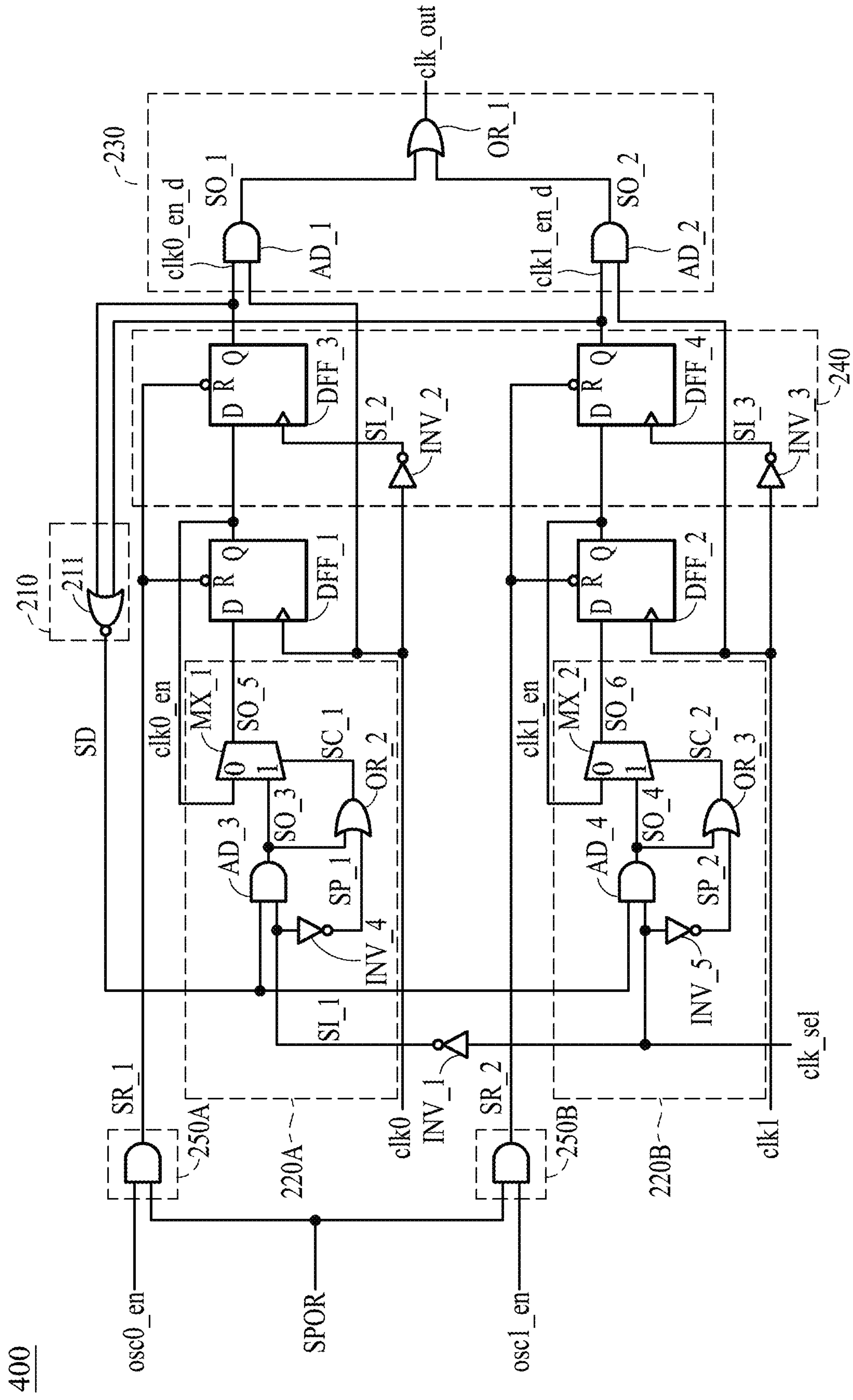
FIG. 4 is a schematic diagram of another exemplary embodiment of the switching circuit according to various aspects of the present disclosure.

FIG. 4 is a schematic diagram of another exemplary embodiment of the switching circuit according to various aspects of the present disclosure. FIG. 4 is similar to FIG. 2B with the exception that the switching circuit 400 in FIG. 4 further comprises logic gates 250A and 250B. In other embodiments, the logic gates 250A and 250B can be applied to FIG. 2.

The logic gate 250A provides a reset signal SR_1 to the reset terminals of the D-type flip-flops DFF_1 and DFF_3 according to the enable signal osc0_en and a power-on reset signal SPOR. In one embodiment, when the power-on reset signal SPOR is not in a specific level (e.g., a high level), the logic gate 250A uses the power-on reset signal SPOR as the reset signal SR_1.

The logic gate 250B provides a reset signal SR_2 to the reset terminals of the D-type flip-flops DFF_2 and DFF_4 according to the enable signal osc1_en and the power-on reset signal SPOR. In one embodiment, when the power-on reset signal SPOR is not in a specific level (e.g., a high level), the logic gate 250B uses the power-on reset signal SPOR as the reset signal SR_2.

In this embodiment, the power-on reset signal SPOR is used to reset the D-type flip-flops DFF_1~DFF_4 before the switching circuit 400 starts working. Therefore, the enable signals clk0_en and clk1_en, and the delayed signals clk0_en_d and clk1_en_d are set to a low level. The kinds of logic gates 250A and 250B are not limited in the present disclosure. In this embodiment, the logic gates 250A and 250B are AND gates.

When the power-on reset signal SPOR is enabled to a low level, the reset signals SR_1 and SR_2 are at a low level. Since the reset signal SR_1 is at a low level, the D-type flip-flop DFF_1 sets the enable signal clk0_en to a low level and the D-type flip-flop DFF_3 sets the delayed signal clk0_en_d to a low level. Additionally, the reset signal SR_2 is at a low level, the D-type flip-flop DFF_2 sets the enable signal clk1_en to a low level and the D-type flip-flop DFF_4 sets the delayed signal clk1_en_d to a low level. At this time, the delayed signals clk0_en and clk1_en_d are at a low level so that the detection signal SD is at a high level. Therefore, the determination circuit 220A provides the inverted signal SI_1 to the D-type flip-flop DFF_1 and the determination circuit 220B provides the selection signal clk_sel to the D-type flip-flop DFF_2.

When the selection signal clk_sel is at a low level, the D-type flip-flop DFF_1 sets the enable signal clk0_en to a high level. When the level of the clock signal clk0 is changed from a high level to a low level, the D-type flip-flop DFF_3 sets the delayed signal clk0_en_d to a high level. Therefore, the AND gate AD_1 uses the clock signal clk0 as the output signal SO_1. At this time, the D-type flip-flop DFF_2 sets the enable signal clk1_en to a low level. When the level of the clock signal clk1 is changed from a high level to a low level, the D-type flip-flop DFF_4 sets the delayed signal clk1_en_d to a low level. Therefore, the AND gate AD_2 does not use the clock signal clk1 as the output signal SO_2. Therefore, the OR gate OR_1 uses the clock signal clk0 as the output clock clk_out.

When the selection signal clk_sel is at a high level, the D-type flip-flop DFF_2 sets the enable signal clk1_en to a high level. When the level of the clock signal clk1 is changed from a high level to a low level, the D-type flip-flop DFF_4 sets the delayed signal clk1_en_d to a high level. Therefore, the AND gate AD_2 uses the clock signal clk1 as the output signal SO_2. At this time, the D-type flip-flop DFF_1 sets the enable signal clk0_en to a low level. When the level of the clock signal clk0 is changed from a high level to a low level, the D-type flip-flop DFF_3 sets the delayed signal clk0_en_d to a low level. Therefore, the AND gate AD_1 does not use the clock signal clk0 as the output signal SO_1. Therefore, the OR gate OR_1 uses the clock signal clk1 as the output clock clk_out.

It will be understood that when an element is referred to as being "on", "connected to" or "coupled to" another element, it can be directly on, connected or coupled to the other element or intervening elements may be present. In contrast, when an element is referred to as be "directly on", "directly connected to" or "directly coupled to" another element, there are no intervening elements present. Additionally, "enable" shall mean changing the state of a Boolean signal. Boolean signals may be enabled high or with a higher voltage, and Boolean signals may be enabled low or with a lower voltage, at the discretion of the circuit designer. Similarly, "disable" shall mean changing the state of the Boolean signal to a voltage level opposite the enabled state.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching circuit coupled to a first oscillator circuit, which generates a first clock signal according to a first enable signal, and a second oscillator, which generates a second clock signal according to a second enable signal, comprising:

a detection circuit detecting a third enable signal and a fourth enable signal to generate a detection signal;

a first inverter inverting a selection signal to generate a first inverted signal;

a first determination circuit outputting the first inverted signal in response to the detection signal being at a specific level;

a first D-type flip-flop receiving the first inverted signal and using the first inverted signal as the third enable signal according to the first clock signal;

a second determination circuit outputting the selection signal in response to the detection signal being at the specific level;

a second D-type flip-flop receiving the selection signal and using the selection signal as the fourth enable signal according to the second clock signal; and a clock gating circuit using the first or second clock signal as an output clock according to the third and fourth enable signals, wherein:

the first D-type flip-flop comprises a first reset terminal receiving the first enable signal, and the second D-type flip-flop comprises a second reset terminal receiving the second enable signal.

2. The switching circuit as claimed in claim 1, further comprising:

a second inverter inverting the first clock signal to generate a second inverted signal;

a third D-type flip-flop coupled between the first D-type flip-flop and the clock gating circuit and using the third enable signal as a first delayed signal according to the second inverted signal;

a third inverter inverting the second clock signal to generate a third inverted signal; and a fourth D-type flip-flop coupled between the second D-type flip-flop and the clock gating circuit and using the fourth enable signal as a second delayed signal according to the third inverted signal.

3. The switching circuit as claimed in claim 2, wherein the third D-type flip-flop comprises a third reset terminal receiving the first enable signal, and the fourth D-type flip-flop comprises a fourth reset terminal receiving the second enable signal.

4. The switching circuit as claimed in claim 2, wherein the clock gating circuit comprises:

a first AND gate determining whether to use the first clock signal as a first output signal according to the first delayed signal;

a second AND gate determining whether to use the second clock signal as a second output signal according to the second delayed signal; and a first OR gate generating the output clock according to the first and second output signals.

5. The switching circuit as claimed in claim 1, wherein the detection circuit comprises:

a NOR gate generating the detection signal according to the third and fourth enable signals.

6. The switching circuit as claimed in claim 5, wherein the first determination circuit comprises:

a third AND gate generating a third output signal according to the detection signal and the first inverted signal;

a second OR gate generating a first control signal according to the third output signal and a first processed signal; and a first multiplexer providing the third enable signal or the third output signal to the first D-type flip-flop according to the first control signal, wherein the first processed signal is the same as the selection signal.

7. The switching circuit as claimed in claim 6, further comprising:
a fourth inverter inverting the first inverted signal to generate the first processed signal.

8. The switching circuit as claimed in claim 7, wherein the second determination circuit comprises:
a fourth AND gate generating a fourth output signal according to the detection signal and the selection signal;
a third OR gate generating a second control signal according to the fourth output signal and a second processed signal; and
a second multiplexer providing the fourth enable signal or the fourth output signal to the second D-type flip-flop according to the second control signal.

9. The switching circuit as claimed in claim 8, further comprising:
a fifth inverter inverting the selection signal to generate the second processed signal.

10. The switching circuit as claimed in claim 1, further comprising:
a first logic gate providing a first reset signal to the first reset terminal according to the first enable signal and a power-on reset signal; and
a second logic gate providing a second reset signal to the second reset terminal according to the second enable signal and the power-on reset signal.

11. A clock supply circuit providing an output clock according to a selection signal and comprising:
a first oscillator circuit generating a first clock signal according to a first enable signal;
a second oscillator circuit generating a second clock signal according to a second enable signal; and
a switching circuit using the first or second clock signal as the output clock according to the selection signal and comprising:
a detection circuit detecting a third enable signal and a fourth enable signal to generate a detection signal;
an inverter inverting the selection signal to generate a first inverted signal;
a first determination circuit outputting the first inverted signal in response to the detection signal being at a specific level;
a first D-type flip-flop receiving the first inverted signal and using the first inverted signal as the third enable signal according to the first clock signal;
a second determination circuit outputting the selection signal in response to the detection signal being at the specific level;
a second D-type flip-flop receiving the selection signal and using the selection signal as the fourth enable signal according to the second clock signal; and
a clock gating circuit using the first or second clock signal as the output clock according to the third and fourth enable signals,
wherein:
the first D-type flip-flop comprises a first reset terminal receiving the first enable signal, and
the second D-type flip-flop comprises a second reset terminal receiving the second enable signal.

12. The clock supply circuit as claimed in claim 11, wherein:
in response to the first enable signal being at the specific level, the first oscillator circuit generates the first clock signal, and
in response to the first enable signal not being at the specific level, the first oscillator circuit stops generating the first clock signal.

13. The clock supply circuit as claimed in claim 11, further comprising:
a first logic gate providing a first reset signal to the first reset terminal according to the first enable signal and a power-on reset signal; and
a second logic gate providing a second reset signal to the second reset terminal according to the second enable signal and the power-on reset signal.

14. The clock supply circuit as claimed in claim 13, wherein:
in response to the power-on reset signal not being at the specific level:
the first logic gate uses the power-on reset signal as the first reset signal, and
the second logic gate uses the power-on reset signal as the second reset signal.

15. The clock supply circuit as claimed in claim 11, wherein in response to a level of the first reset terminal not being at the specific level, the first D-type flip-flop sets the third enable signal so that it is not equal to the specific level.

16. The clock supply circuit as claimed in claim 11, wherein the detection circuit comprises:
a NOR gate coupled to the first D-type flip-flop and the second D-type flip-flop to receive the third and fourth enable signals,
wherein in response to the third and fourth enable signals not being at the specific level, the NOR gate sets the detection signal to the specific level.

17. The clock supply circuit as claimed in claim 11, further comprising:
a synchronization circuit coupled to the first determination circuit, the second determination circuit and the clock gating circuit.

18. The clock supply circuit as claimed in claim 17, wherein the synchronization circuit comprises:
a second inverter inverting the first clock signal to generate a second inverted signal;
a third D-type flip-flop coupled between the first D-type flip-flop and the clock gating circuit and using the third enable signal as a first delayed signal according to the second inverted signal;
a third inverter inverting the second clock signal to generate a third inverted signal; and
a fourth D-type flip-flop coupled between the second D-type flip-flop and the clock gating circuit and using the fourth enable signal as a second delayed signal according to the third inverted signal.

19. The clock supply circuit as claimed in claim 18, wherein the detection circuit comprises:
a NOR gate coupled to the third D-type flip-flop and the fourth D-type flip-flop to receive the first and second delayed signals,
wherein in response to the first and second delayed signal not being at the specific level, the NOR gate sets the detection signal to the specific level.

20. The clock supply circuit as claimed in claim 11, wherein:
in response to an occurrence of a specific event:
the first enable signal is restored to a first predetermined level, and
the second enable signal is restored to a second predetermined level, the first predetermined level is different from the second predetermined level.

* * * * *